United States Patent
Asao et al.

(10) Patent No.: US 8,221,284 B2
(45) Date of Patent: Jul. 17, 2012

(54) AUTOMOTIVE DRIVE APPARATUS

(75) Inventors: Yoshihito Asao, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1256 days.

(21) Appl. No.: 11/952,678

(22) Filed: Dec. 7, 2007

(65) Prior Publication Data

US 2008/0318729 A1 Dec. 25, 2008

(30) Foreign Application Priority Data

Jun. 21, 2007 (JP) ................................. 2007-163742

(51) Int. Cl.
 *B60W 10/30* (2006.01)
(52) U.S. Cl. .......................... 477/5; 180/53.8; 180/65.27
(58) Field of Classification Search ............... 180/65.27, 180/65.275, 53.8; 477/3
 See application file for complete search history.

(56) References Cited

U.S. PATENT DOCUMENTS

| | | | | | |
|---|---|---|---|---|---|
| 4,459,489 | A | * | 7/1984 | Kirk et al. ......................... | 290/13 |
| 4,489,242 | A | * | 12/1984 | Worst ............................ | 307/10.1 |
| 5,558,173 | A | * | 9/1996 | Sherman ...................... | 180/53.8 |
| 5,635,805 | A | * | 6/1997 | Ibaraki et al. ................. | 318/139 |
| 5,669,842 | A | * | 9/1997 | Schmidt ............................. | 475/5 |
| 5,755,303 | A | * | 5/1998 | Yamamoto et al. ......... | 180/65.25 |
| 6,048,288 | A | * | 4/2000 | Tsujii et al. ......................... | 477/5 |
| 6,223,844 | B1 | * | 5/2001 | Greenhill et al. .............. | 429/429 |
| 6,501,190 | B1 | * | 12/2002 | Seguchi et al. .................. | 290/46 |
| 6,524,218 | B1 | * | 2/2003 | Yamada et al. .................... | 477/5 |
| 6,796,367 | B2 | * | 9/2004 | Blacquiere et al. ............. | 165/41 |
| 6,801,842 | B2 | * | 10/2004 | Egami et al. ..................... | 701/36 |
| 6,863,139 | B2 | * | 3/2005 | Egami et al. ................. | 180/53.8 |
| 7,119,454 | B1 | * | 10/2006 | Chiao ............................. | 307/9.1 |
| 7,174,977 | B2 | * | 2/2007 | Enjoji et al. ................. | 180/65.1 |
| 7,282,003 | B2 | * | 10/2007 | Klemen et al. ..................... | 475/5 |
| 7,506,711 | B2 | * | 3/2009 | Usoro ........................ | 180/65.23 |
| 7,547,264 | B2 | * | 6/2009 | Usoro ............................... | 475/5 |
| 7,582,034 | B2 | * | 9/2009 | Usoro ............................... | 475/5 |
| 7,695,400 | B2 | * | 4/2010 | McGee ............................. | 477/5 |
| 7,726,275 | B2 | * | 6/2010 | Deniston et al. .......... | 123/198 R |

(Continued)

FOREIGN PATENT DOCUMENTS

| | | |
|---|---|---|
| DE | 19727058 A1 | 2/1998 |
| JP | 59083600 A | 5/1984 |
| JP | 61228153 A | 10/1986 |

OTHER PUBLICATIONS

German Office Action corresponding to German Patent Application No. 102008003461.4-21, dated Jul. 2, 2010.

*Primary Examiner* — Jeffrey J Restifo
(74) *Attorney, Agent, or Firm* — Sughrue Mion, PLLC

(57) ABSTRACT

An engine, an electric motor-generator, an oil pump, an air conditioner, and a first power transmitting means that performs power transmission among a crank shaft of the engine, a rotating shaft of the electric motor-generator, and rotating shafts of the oil pump and the air conditioner are included. The first power transmitting means has: a crank pulley; a first electric motor-generator pulley; an oil pump pulley; an air conditioner pulley; a first belt that is wound around these pulleys; and a first one-way clutch that is interposed between the rotating shaft and the first electric motor-generator pulley so as to transmit a rotational driving force from the crank shaft to the rotating shaft without transmitting a rotational driving force from the rotating shaft to the crank shaft, and the electric motor-generator is motor driven while the engine is being driven.

13 Claims, 9 Drawing Sheets

U.S. PATENT DOCUMENTS

| | | | |
|---|---|---|---|
| 7,748,482 B2 * | 7/2010 | Holmes et al. | 180/65.22 |
| 7,748,483 B2 * | 7/2010 | Usoro | 180/65.27 |
| 7,753,147 B2 * | 7/2010 | Usoro | 180/53.8 |
| 7,954,580 B2 * | 6/2011 | Usoro | 180/65.275 |
| 2003/0116368 A1 * | 6/2003 | Winkelman et al. | 180/65.2 |
| 2007/0080008 A1 * | 4/2007 | Chiao | 180/65.3 |
| 2007/0103002 A1 * | 5/2007 | Chiao et al. | 307/10.1 |
| 2009/0298646 A1 * | 12/2009 | Parsons | 477/167 |

* cited by examiner

AUTOMOTIVE DRIVE APPARATUS

BACKGROUND OF THE INVENTION

1. Field of the Invention

The present invention relates to an automotive drive apparatus in which an electric motor-generator and auxiliary machines are linked to a crank shaft of an engine by means of a belt, and particularly relates to a quiet, highly reliable automotive drive apparatus that enables efficient rotational driving of an electric motor-generator and auxiliary machines.

2. Description of the Related Art

In recent years, reductions in automobile exhaust gas and $CO_2$ have been in demand for purposes of global environmental protection. There is an urgent need for improvements in automobile fuel consumption in particular, since $CO_2$ is discharged in proportion to automobile fuel consumption. Hybrid vehicles and idling-reduced vehicles are spreading as fuel consumption improving measures. Steady engine improvements have also been actively pursued, although their fuel consumption improving effects are limited.

In automobiles, an automotive alternator that supplies electric power to automotive electrical equipment, storage batteries, etc., is normally coupled by means of a belt directly to a crank pulley that is coupled directly to an output shaft of an engine. Auxiliary machines such as water pumps, air conditioners, power steering pumps, etc., are also coupled to the crank pulley by means of belts in a similar manner to the automotive alternator.

The automotive alternator and the auxiliary machines are coupled by means of the belts directly to the crank pulley that is coupled directly to the output shaft of the engine, which operates constantly, and it is extremely important to reduce losses in the rotations of these belts for improvements in automobile fuel consumption since these auxiliary machines constitute loads on the engine even when they are not operating.

In that regard, improving generating efficiency in the automotive alternator is of course important. However, since input for power generation is obtained from engine output, in other words from fuel, electric power management is required so as to generate required amounts of power when required, etc., in such a way that efficiency in the engine and the vehicle as a whole are improved, and not simply generating efficiency alone. In particular, effective use of "regeneration", in which kinetic energy that would otherwise be wasted is recovered and used to generate power during braking, etc., is extremely important for fuel consumption improvements.

In addition, since the belts are rotated by the engine constantly, loss due to slippage and thermal radiation from the belts as engine torque is being transmitted to the automotive alternator and the auxiliary machines not only makes engine efficiency poor, but also has a large influence on noise and belt service life.

In order to solve these problems, generated voltage has been controlled by gradually increasing the field current in such a way that sudden increases in torque load are not imposed on the engine when large electric loads have been connected to the alternator (see Patent Literature 1, for example). Engine stalling, belt load increases, and belt slippage are thereby prevented.

One-way clutches have also been used in automotive alternators to block a rotational transmission pathway in one direction to try to suppress early damage to belts, noise due to slippage, etc., and to prolong durable service life (see Patent Literature 2, for example).

Patent Literature 1: Japanese Patent Publication No. HEI 5-52160 (Gazette)
Patent Literature 2: Japanese Patent Publication No. HEI 7-72585 (Gazette)

In the technique according to Patent Literature 1, engine burden is reduced by controlling the operation of the alternator itself so as to cooperate with the engine. However, the technique according to Patent Literature 1 did not take into consideration overall action of the belts including those of auxiliary machines, and although at least some loss in the rotation of the belts was reduced, the effects thereof were small. In addition, since field current, which has a large time constant, is controlled, there are limits to its responsiveness, making it difficult to operate the alternator so as to cooperate any more closely with the engine.

In the technique according to Patent Literature 2, since the rotational transmission pathway between the automotive alternator and the engine is interrupted completely by the one-way clutch sliding mechanically, belt loss reductions, slippage noise suppression, and prolongment of durable service life have been effected to a certain extent, but have not been satisfactory. In addition, since the pulley that has the one-way clutch mechanism also has a small diameter and is complex in construction, significant problems still remain in the durability of the one-way clutch mechanism pulley itself. Since the one-way clutch is a mechanism that slides mechanically, and an automotive alternator that has a one-way clutch pulley stops later than the engine due to inertia in its rotor when the engine goes from low speed to high speed, fan noise due to rotation of the rotor has been unpleasant for the driver and for people in a vicinity of the vehicle.

Thus, the techniques according to Patent Literature 1 and 2 have been invented with a view to effects of the alternator on the engine and the belts and have not taken into consideration improvements in efficiency of the engine and the vehicle as a whole including the auxiliary machines.

SUMMARY OF THE INVENTION

An object of the present invention is to provide an automotive drive apparatus that improves overall vehicle and engine efficiency that includes an engine and auxiliary machines from a mechanical viewpoint that considers belts while controlling operation of an electric motor-generator.

In order to achieve the above object, according to one aspect of the present invention, there is provided an automotive drive apparatus including: an engine; an electric motor-generator that has a generating function and an electric motor function; a first auxiliary machine; and a first power transmitting means that performs power transmission among a crank shaft of the engine, a rotating shaft of the electric motor-generator, and a rotating shaft of the first auxiliary machine. The first power transmitting means has: a crank pulley that is mounted to the crank shaft of the engine; a first electric motor-generator pulley that is mounted to the rotating shaft of the electric motor-generator; a first auxiliary machine pulley that is mounted to the rotating shaft of the first auxiliary machine; a first belt that is wound around the crank pulley, the first electric motor-generator pulley, and the first auxiliary machine pulley; and a first one-way clutch that is interposed between the rotating shaft of the electric motor-generator and the first electric motor-generator pulley so as to transmit a rotational driving force from the crank shaft of the engine to the rotating shaft of the electric motor-generator without transmitting a rotational driving force from the rotating shaft of the electric motor-generator to the crank shaft of the engine, and the electric motor-generator is motor driven while the engine is being driven.

According to the present invention, because the electric motor-generator is motor driven, load that acts on the engine is reduced, enabling driving force to the first auxiliary machine to be increased proportionately, and improving overall vehicle and engine efficiency.

In addition, load that acts on the first one-way clutch is reduced by motor driving the electric motor-generator, improving durability of the first one-way clutch.

DETAILED DESCRIPTION OF THE PREFERRED EMBODIMENTS

Embodiment 1

Figure 1:
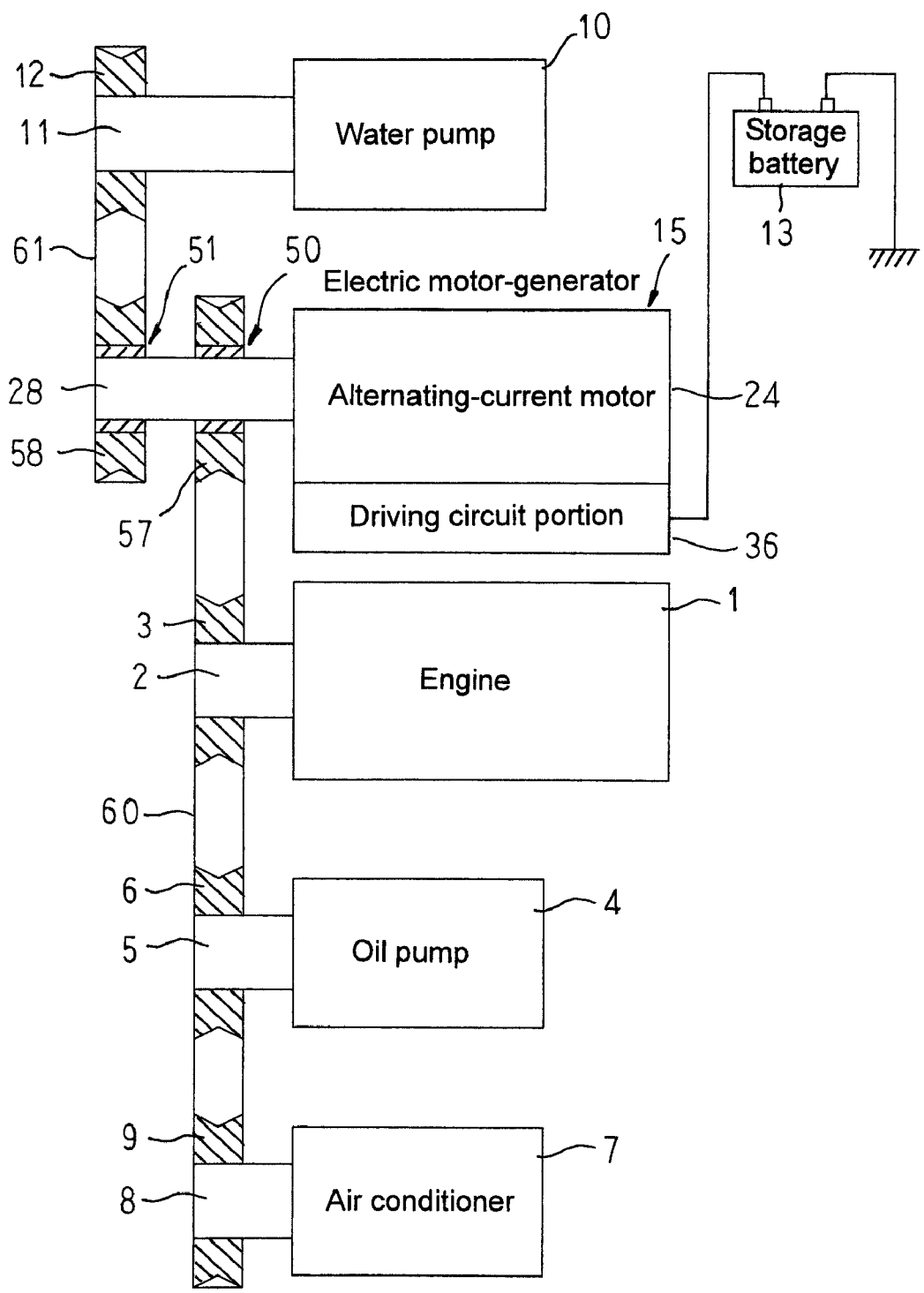
FIG. 1 is a system configuration diagram of an automotive drive apparatus according to Embodiment 1 of the present invention.
Figure 2:
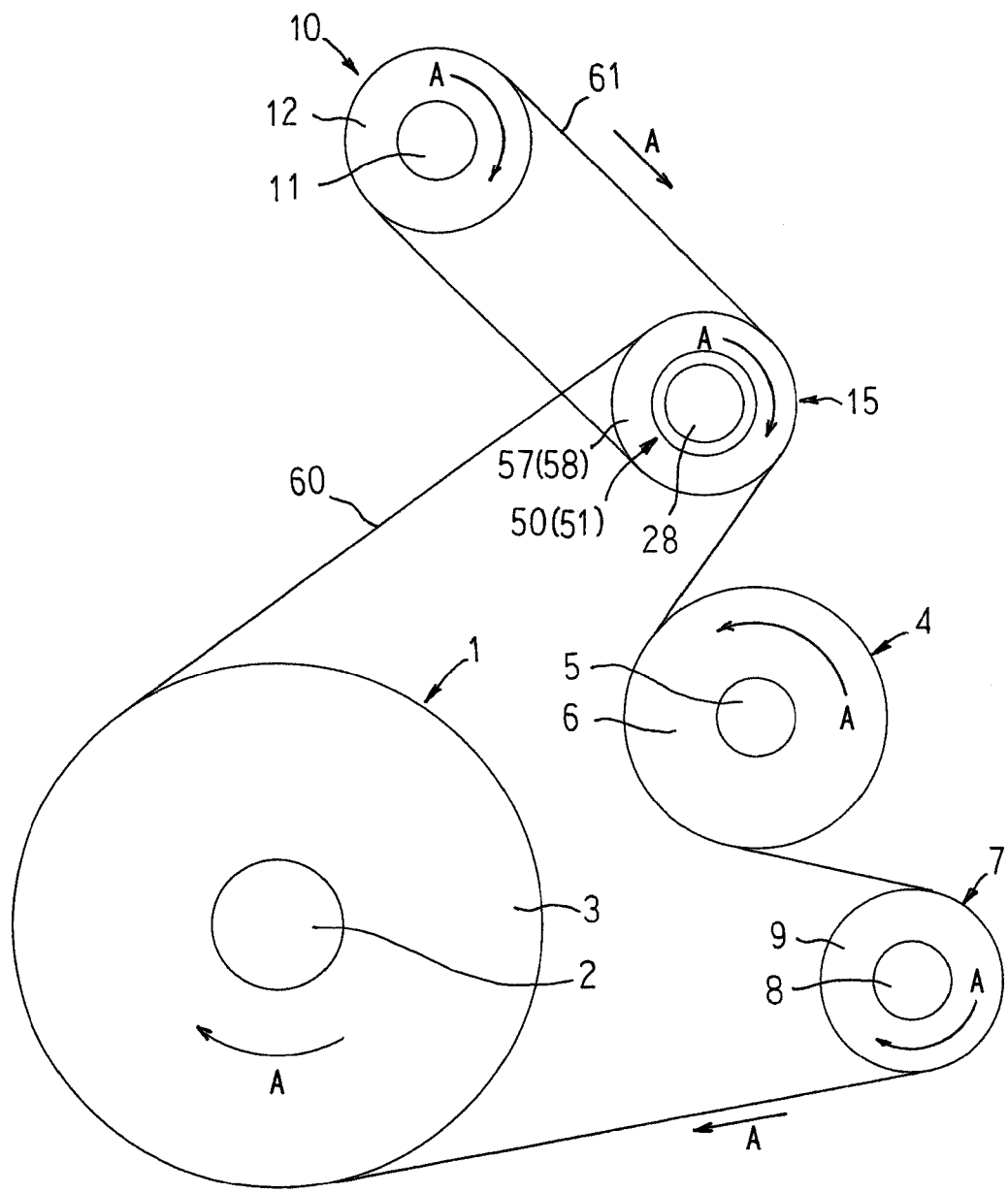
FIG. 2 is a diagram that schematically shows a power transmission pathway in the automotive drive apparatus according to Embodiment 1 of the present invention.

FIG. 1 is a system configuration diagram of an automotive drive apparatus according to Embodiment 1 of the present invention, and FIG. 2 is a diagram that schematically shows a power transmission pathway in the automotive drive apparatus according to Embodiment 1 of the present invention.

In FIGS. 1 and 2, an automotive drive apparatus includes: an engine 1; an electric motor-generator 15 that has a generating function and an electric motor function; an auxiliary machines such as an oil pump 4 and an air conditioner 7 that function as a first auxiliary machine, and a water pump 10 that functions as a second auxiliary machine; and a storage battery 13.

A crank pulley 3 is fixed to a crank shaft 2 that constitutes an output shaft of the engine 1. An oil pump pulley 6 is fixed to a rotating shaft 5 of the oil pump 4, an air conditioner pulley 9 is fixed to a rotating shaft 8 of the air conditioner 7, and a water pump pulley 12 is fixed to a rotating shaft 11 of the water pump 10. First and second one-way clutches 50 and 51 are fixed to a rotating shaft 28 of the electric motor-generator 15, and are juxtaposed axially. First and second electric motor-generator pulleys 57 and 58 are configured integrally on a clutch outer 53 of the first and second one-way clutches 50 and 51.

A first belt 60 is wound around the crank pulley 3, the oil pump pulley 6, the air conditioner pulley 9, and the first electric motor-generator pulley 57. A second belt 61 is wound around the water pump pulley 12 and the second electric motor-generator pulley 58. The first one-way clutch 50 is configured so as to transmit rotational torque from the crank shaft 2 to the rotating shaft 28 of the electric motor-generator 15 in a direction that is indicated by arrows A in FIG. 2. The second one-way clutch 51 is configured so as to transmit rotational torque from the rotating shaft 28 of the electric motor-generator 15 to the rotating shaft 11 of the water pump 10 as indicated by arrows A in FIG. 2.

Here, the crank pulley 3, the oil pump pulley 6, the air conditioner pulley 9, the first one-way clutch 50, the first electric motor-generator pulley 57, and the first belt 60 constitute a first power transmitting means, and the second one-way clutch 51, the second electric motor-generator pulley 58, and the water pump pulley 12 constitute a second power transmitting means.

In an automotive drive apparatus that is configured in this manner, rotational torque from the engine 1 is transmitted by means of the crank pulley 3 and the first belt 60 from the crank shaft 2 to the oil pump pulley 6 that is fixed to the rotating shaft 5 of the oil pump 4, the air conditioner pulley 9 that is fixed to the rotating shaft 8 of the air conditioner 7, and the first electric motor-generator pulley 57. The rotational torque that is transmitted to the first electric motor-generator pulley 57 is transmitted to the rotating shaft 28 of the electric motor-generator 15 by means of the first one-way clutch 50. The oil pump 4, the air conditioner 7, and the electric motor-generator 15 are driven thereby. The rotational torque from the rotating shaft 28 of the electric motor-generator 15 is transmitted by means of the second one-way clutch 51, the second electric motor-generator pulley 58, and the second belt to the water pump pulley 12 that is fixed to the rotating shaft 11 of the water pump 10, driving the water pump 10.

Figure 3:
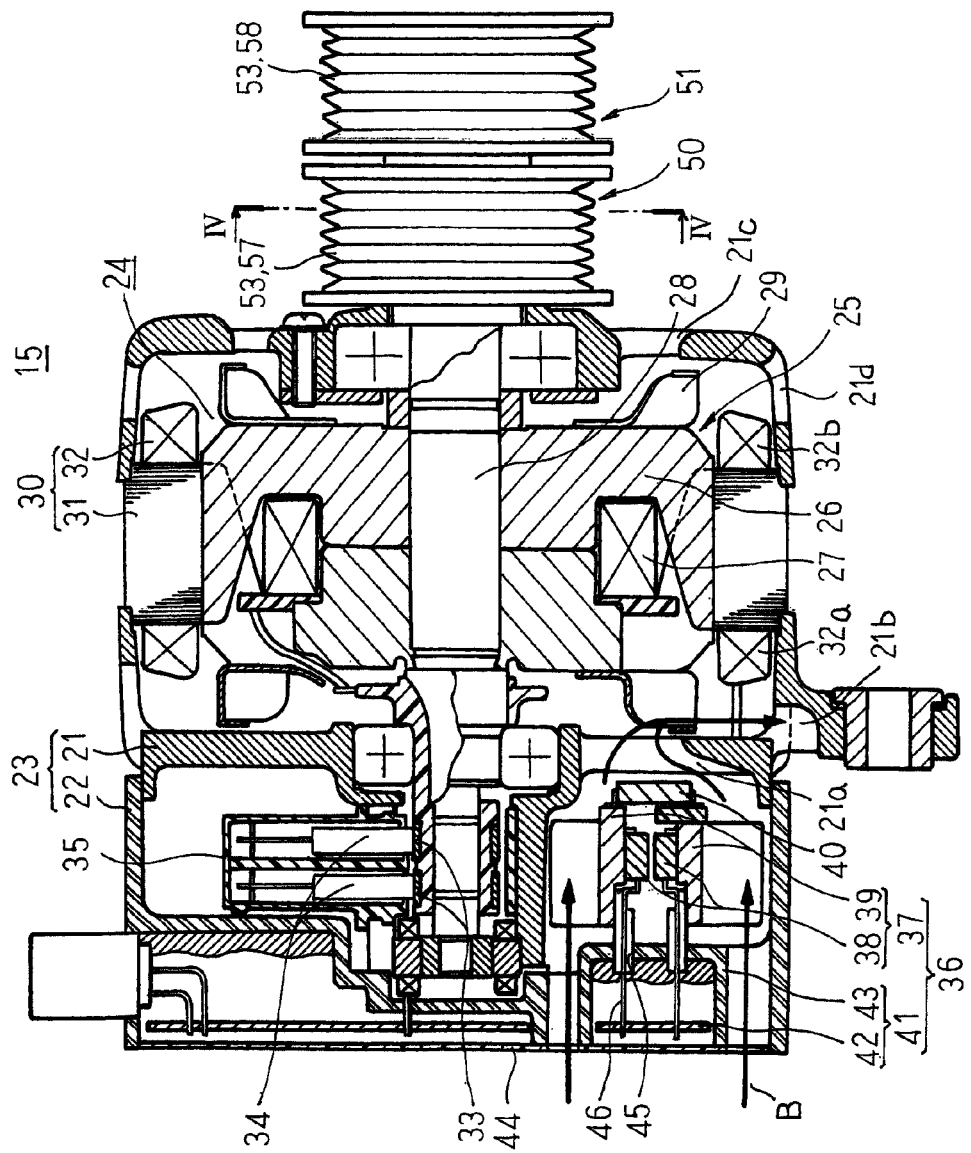
FIG. 3 is a cross section of an electric motor-generator in the automotive drive apparatus according to Embodiment 1 of the present invention.
Figure 4:
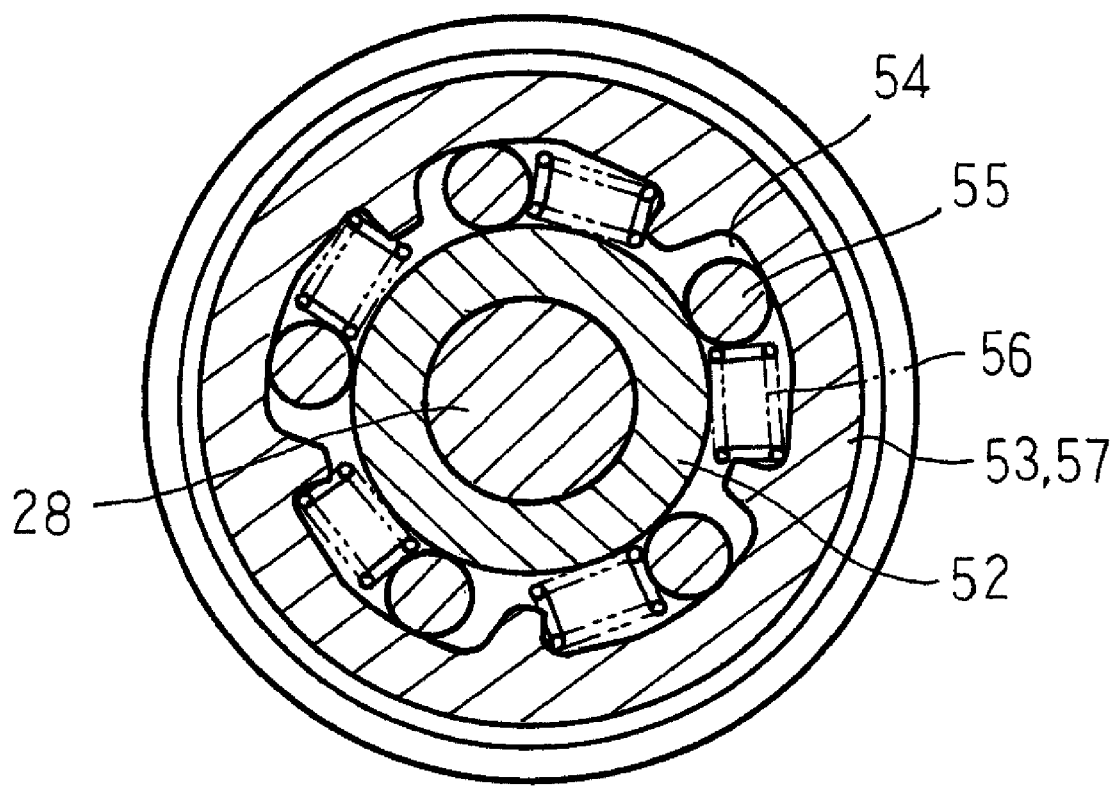
FIG. 4 is a cross section taken along line IV-IV in FIG. 3 viewed from the direction of the arrows.

Next, a configuration of the electric motor-generator 15 will be explained with reference to FIGS. 3 and 4. FIG. 3 is a cross section of an electric motor-generator in the automotive drive apparatus according to Embodiment 1 of the present invention, and FIG. 4 is a cross section taken along line IV-IV in FIG. 3 viewed from the direction of the arrows.

In FIG. 3, an electric motor-generator 20 includes: a container 23 that is constituted by a motor housing 21 and an external case 22; an alternating-current motor 24; and a driving circuit portion 36.

The alternating-current motor 24 includes: a rotor 25 that is fixed to the rotating shaft 28 that is rotatably supported at a central axial position of the motor housing 21; and a stator 30 that is held by an inner wall surface of the motor housing 21 so as to surround the rotor 25. The rotor 25 includes: a rotor core 26 that is fixed to the rotating shaft 28; a field winding 27 that is wound onto the rotor core 26; and fans 29 that are fixed to two axial end surfaces of the rotor core 26. The stator 30 includes: a cylindrical stator core 31; and an armature winding 32 that is wound onto the stator core 31. A pair of slip rings 33 that supply electric current to the field winding 27 are fixed to a first end of the rotating shaft 28 that projects out through the motor housing 21. Brushes 34 are disposed inside a brush holder 35 that is disposed radially outside the slip rings 33 so as to slide in contact with the respective slip rings 33.

The driving circuit portion 36 is constituted by a power circuit portion 37 and a control circuit portion 41. The power circuit portion 37 has: a plurality of switching elements 38 that constitute an inverter circuit that supplies current to the armature winding 32 of the alternating-current motor 24; and a heatsink 39 onto which the plurality of switching elements 38 are mounted, and is disposed on an outer circumference at a first end of the motor housing 21 so as to be positioned in a common plane with the brush holder 35 that is perpendicular to a central axis of the rotating shaft 28 so as to face the fans 29. The power circuit portion 37 is connected to a smoothing capacitor 40. The external case 22 is mounted onto the first end of the motor housing 21 so as to cover the brush holder 35 and the power circuit portion 37. A case 43 that is open at the first end is formed on the external case 22 so as to be positioned at the first end of the power circuit portion 37.

The control circuit portion 41 includes a control circuit board 42 that is housed inside the case 43 so as to be thermally isolated from the power circuit portion 37. The opening at the first end of the case 43 is covered by a cover 44. The control circuit portion 41 is connected to the power circuit portion 37 by a signal wire 46 that passes through a penetrating aperture 45 that is disposed through the case 43.

The first and second electric motor-generator pulleys 57 and 58 are configured integrally with the clutch outers 53 of the first and second one-way clutches 50 and 51, which are juxtaposed axially on a second end portion of the rotating shaft 28 that projects out through the motor housing 21.

As shown in FIG. 4, the first one-way clutch 50 is configured such that a clutch inner 52 and the clutch outer 53 are disposed concentrically, a plurality of wedge-shaped spaces 54 are formed circumferentially in a gap between the clutch inner 52 and the clutch outer 53, rollers 55 are disposed inside the respective wedge-shaped spaces 54, and springs 56 are disposed inside the wedge-shaped spaces 54 so as to force the rollers 55 in a direction in which the wedge-shaped spaces 54 become narrower (counterclockwise in FIG. 4). The first one-way clutch 50 is mounted by fixing the clutch inner 52 to the rotating shaft 28 in a fitted-over state such that the gaps of the wedge-shaped spaces 54 gradually become narrower in the direction of the arrow A in FIG. 2. V-shaped grooves are formed on an outer circumferential surface of the clutch outer 53 to constitute the first electric motor-generator pulley 57. In other words, the first electric motor-generator pulley 57 is configured integrally on the clutch outer 53. The second one-way clutch 51 is fixed to the rotating shaft 28 so as to be axially adjacent to the first one-way clutch 50. Moreover, the second one-way clutch 51 is configured in a similar manner to the first one-way clutch 50 except for being mounted by fixing the clutch inner 52 to the rotating shaft 28 in a fitted-over state such that the gaps of the wedge-shaped spaces 54 gradually become wider in the direction of the arrow A in FIG. 2.

Next, operation of an automotive drive apparatus that is configured in this manner will be explained.

First, when a key switch (not shown) is switched ON, electric power from a storage battery 13 is supplied to a starter motor (not shown). The starter motor is thereby driven to rotate, starting the engine 1. After complete starting of the engine 1, the electric motor-generator 15 is operated by the driving circuit portion 36 so as to act as a generator.

Then, at the first end of the motor housing 21, air is sucked into the external case 22 as indicated by the arrows B in FIG. 3 when the fans 29 are driven to rotate together with the rotation of the rotor 25. The air that has been sucked into the external case 22 flows axially, cools the power circuit portion 37, and then flows into the motor housing 21 through air intake apertures 21a on the motor housing 21. Then, the air that has flowed into the motor housing 21 is deflected centrifugally by the fans 29, cools a coil end 32a of the armature winding 32, and is then discharged through air discharge apertures 21b. Thus, heat that is generated in the switching elements 38 is radiated into the air by means of the heatsink 39, suppressing excessive temperature increases in the switching elements 38. Similarly, heat that is generated in the armature winding 32 is radiated into the air through the coil end 32a, suppressing excessive temperature increases in the armature winding 32.

At the same time, at the second end of the motor housing 21, air flows into the motor housing 21 through the air intake apertures 21c, is deflected centrifugally by the fans 29, cools a coil end 32b of the armature winding 32, and is then discharged through air discharge apertures 21d. Thus, excessive temperature increases are suppressed in the armature winding 32.

When the engine 1 is driven and the crank shaft 2 rotates in the direction of arrow A in FIG. 2, rotational torque from the crank shaft 2 is transmitted to the first electric motor-generator pulley 57 by means of the crank pulley 3 and the first belt 60. The rollers 55 of the first one-way clutch 50 move toward the narrow space of the wedge-shaped spaces 54 due to the force from the springs 56, and engage with the wedge-shaped spaces 54. Thus, the clutch inner 52 that is fixed to the rotating shaft 28 and the clutch outer 53 on which the first electric motor-generator pulley 57 is formed integrally turn together, and the rotating shaft 28 rotates in the direction of the arrow A.

As the rotating shaft 28 rotates in the direction of the arrow A, the rollers 55 of the second one-way clutch 51 move toward the narrow space of the wedge-shaped spaces 54 due to the force from the springs 56, and engage with the wedge-shaped spaces 54. The clutch inner 52 that is fixed to the rotating shaft 28 and the clutch outer 53 on which the second electric motor-generator pulley 58 is formed integrally thereby turn together. Thus, rotational torque from the crank shaft 2 is transmitted to the rotating shaft 11 by means of the crank pulley 3, the first belt 60, the first electric motor-generator pulley 57, the first one-way clutch 50, the rotating shaft 28, the second one-way clutch 51, the second electric motor-generator pulley 58, the second belt 61, and the water pump pulley 12, operating the water pump 10. Moreover, because the second one-way clutch 51 is mounted, torque will not be transmitted from the water pump 10 toward the electric motor-generator 15 and the engine 1.

Rotational torque from the crank shaft 2 is also transmitted to the rotating shafts 5 and 8 by means of the crank pulley 3, the first belt 60, the oil pump pulley 6, and the air conditioner pulley 9, driving the oil pump 4 and the air conditioner 7 to rotate.

The rotor 25 is rotated, applying a rotating magnetic field to the armature winding 32 and inducing alternating-current power in the armature winding 32. The alternating-current power that has been induced in the armature winding 32 is converted to direct-current power by the power circuit portion 37, and is charged to the storage battery 13. The direct-current power that is converted by the power circuit portion 37 is supplied to auxiliary machines such as the oil pump 4, the air conditioner 7, etc., operating the oil pump 4 and the air conditioner 7.

Next, belt loss reductions due to the disposition of one-way clutches will be explained. Here, measurements of engine rotational frequency during idling rotation (Ne), electric motor-generator pulley rotational frequency (Np), and electric motor-generator rotor rotational frequency (Nr) in a comparative example that used an electric motor-generator to which a one-way clutches 50 was mounted are shown in FIG. 5B. Moreover, in order to explain one-way clutch belt loss reductions, measurements for a conventional example that used an electric motor-generator in an identical engine to which a one-way clutch had not been mounted are shown in FIG. 5C. Moreover, because driving energy is generated in an engine 1 only during the explosive (power) stroke and driving force is not generated during other strokes, minute fluctuations in angular velocity are always present during rotation of a crank shaft 2. Thus, ripples occur in the engine rotational frequency (Ne) as shown in FIGS. 5B and 5C.

Relative rotational differences do not occur between the engine rotational frequency (Ne) and the electric motor-generator pulley rotational frequency (Np) if the engine 1 is driven to rotate constantly and stably. However, large speed differences may occur between the engine rotational frequency (Ne) and the electric motor-generator pulley rotational frequency (Np) depending on the inertial masses of the respective rotating masses, since the inertial mass of rotors in particular may be large.

Thus, it can be seen from FIG. 5C that in the case of the conventional example tensile stresses act on the belt if the electric motor-generator pulley rotational frequency (Np) is lower than the engine rotational frequency (Ne), but on the other hand, compressive stresses act on the belt if the electric motor-generator pulley rotational frequency (Np) is higher than the engine rotational frequency (Ne), and the electric motor-generator pulley rotational frequency (Np) fluctuates more than the engine rotational frequency (Ne). Thus, in the conventional example, loss due to speed differences between the engine rotational frequency (Ne) and the electric motor-generator pulley rotational frequency (Np) becomes excessive. This loss is indicated by $S_c$ in FIG. 5C.

In the case of the comparative example to which a one-way clutch 50 was mounted, as shown in FIG. 5B, the electric motor-generator pulley rotational frequency (Np) becomes higher than the engine rotational frequency (Ne) due to inertia when the ascending gradient of the engine rotational frequency (Ne) eases off. Then, the one-way clutch 50 slips due to inertia when the rotor rotational frequency (Nr) becomes higher than the electric motor-generator pulley rotational frequency (Np), and the electric motor-generator pulley rotational frequency (Np) and the rotor rotational frequency (Nr) follow different curves.

The electric motor-generator pulley rotational frequency (Np) rises, then gradually decreases to match the engine rotational frequency (Ne). At the same time, the rotor rotational frequency (Nr) rises, and then as it gradually decreases to match the engine rotational frequency (Ne), the clutch inner 52 and the clutch outer 53 of the one-way clutch 50 reengage, transmitting rotational torque from the engine 1 to the rotor 25. Here, the rotor rotational frequency (Nr) drops below the engine rotational frequency (Ne) due to inertia, then rises together with the increase in the engine rotational frequency (Ne). The rotor rotational frequency (Nr) is slightly behind the engine rotational frequency (Ne). Tension acts on the first belt 60 due to the reengagement between the clutch inner 52 and the clutch outer 53, and the electric motor-generator pulley rotational frequency (Np) passes through a transient state of stretching of the first belt 60 before matching the rotor rotational frequency (Nr).

Thus, in the case of the comparative example to which a one-way clutches 50 was mounted, there is also a state in which tensile stresses act on the first belt 60 when the electric motor-generator pulley rotational frequency (Np) is lower than the engine rotational frequency (Ne). However, the one-way clutch 50 slips when the electric motor-generator pulley rotational frequency (Np) is higher than the engine rotational frequency (Ne). Consequently, because loss due to speed differences between the engine rotational frequency (Ne) and the electric motor-generator pulley rotational frequency (Np) in the comparative example is generated only during pulling that transmits the minimum torque from the engine 1 that is required for power generation, the loss is reduced compared to the conventional example in which a one-way clutch 50 was not mounted. The loss in this comparative example is indicated by $S_b$ in FIG. 5B.

From FIGS. 5B and 5C, it can be seen that loss due to speed differences between the engine rotational frequency (Ne) and the electric motor-generator pulley rotational frequency (Np) can be reduced by mounting a one-way clutch 50. However, since the clutch inner 52 and the clutch outer 53 have reverse velocity to each other when the rollers 55 reengage in the wedge-shaped spaces 54 after the one-way clutch 50 has slipped (the instant at point X in FIG. 5B), a large mechanical shock is generated, giving rise to vibration noise and durability problems in the one-way clutch.

In order to solve the problems described above, Embodiment 1 reduces the loads that act on the one-way clutch 50 by driving the electric motor-generator 15 as an electric motor so as to act in concert with engine ripples. Specifically, in Embodiment 1, rotation of the rotor 25 is assisted by driving the electric motor-generator 15 as an electric motor in periods during idling of the engine 1 when the electric motor-generator pulley rotational frequency (Np) is higher than the engine rotational frequency (Ne) and drops due to inertia. Measurements of engine rotational frequency (Ne), electric motor-generator pulley rotational frequency (Np), and electric motor-generator rotor rotational frequency (Nr) in Embodiment 1 during idling rotation are shown in FIG. 5A.

Figure 5A:
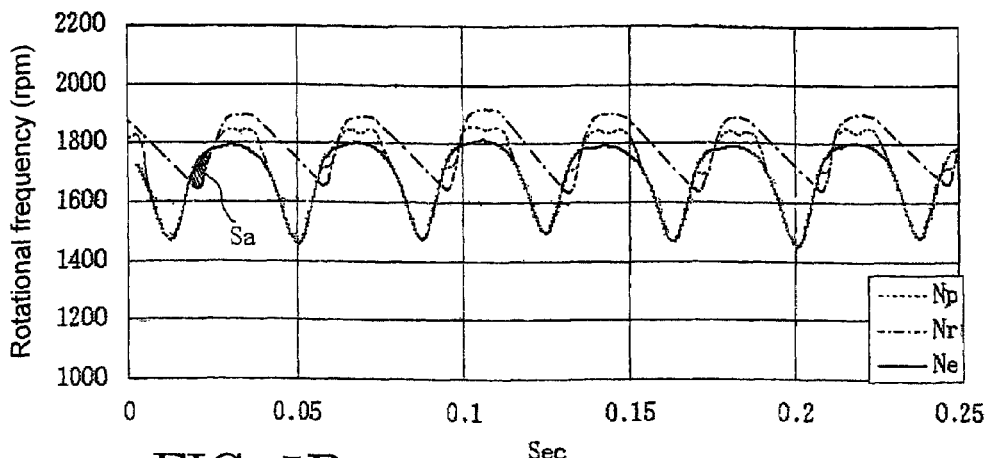
FIG. 5A, 5B, and 5C are graphs of measured results of engine rotational frequency, electric motor-generator pulley rotational frequency, and electric motor-generator rotor rotational frequency during idling in the automotive drive apparatus according to Embodiment 1 of the present invention and comparative examples.
Figure 5B:
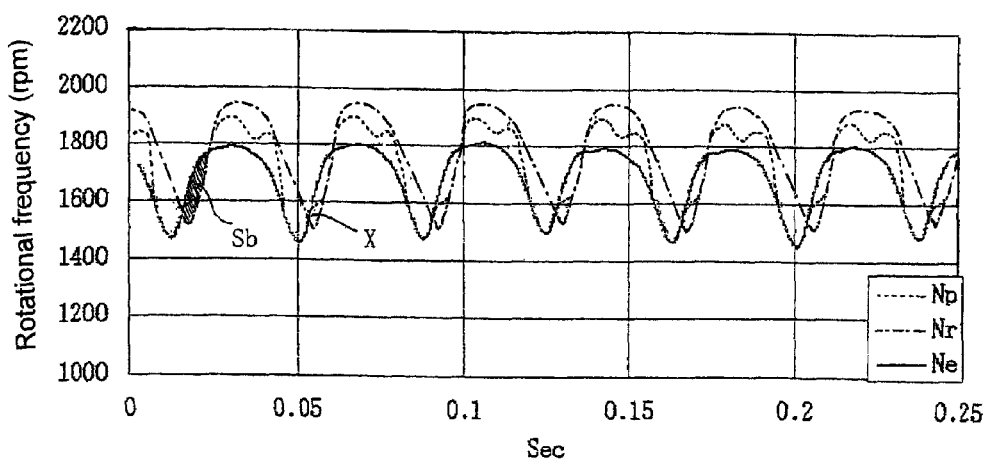
Figure 5C:
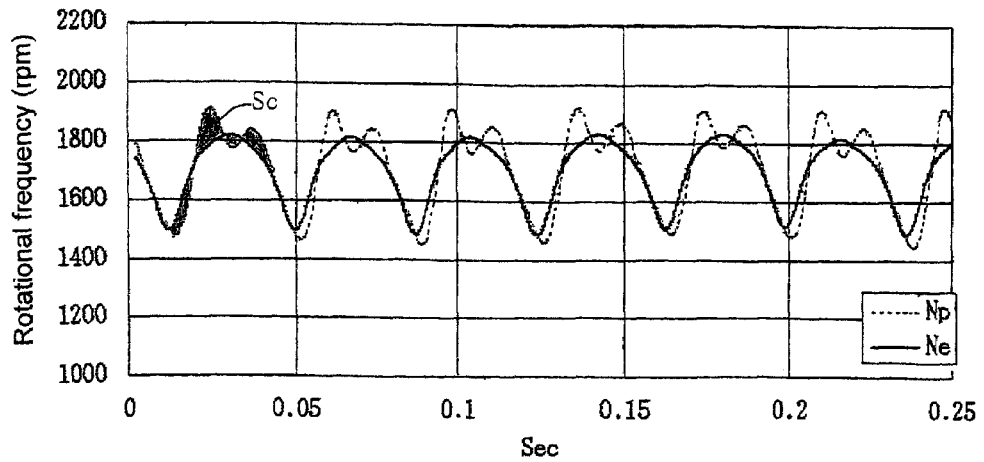

By driving the electric motor-generator 15 as an electric motor in this manner, the descending gradient of the rotor rotational frequency (Nr) becomes gentler, as shown in FIG. 5A. Thus, the rotor rotational frequency (Nr) gradually decreases to match the engine rotational frequency (Ne), the clutch inner 52 and the clutch outer 53 of the one-way clutch 50 reengage, transmitting rotational torque from the engine 1 to the rotor 25. Here, the rotor rotational frequency (Nr) drops below the engine rotational frequency (Ne) due to inertia, then rises together with the increase in the engine rotational frequency (Ne). The rotor rotational frequency (Nr) is slightly behind the engine rotational frequency (Ne). Tension acts an the first belt 60 due to the reengagement between the clutch inner 52 and the clutch outer 53, and the electric motor-generator pulley rotational frequency (Np) passes through a transient state of stretching of the first belt 60 before matching the rotor rotational frequency (Nr).

According to Embodiment 1, because the descending gradient of the rotor rotational frequency (Nr) is gentler, rotational frequency fluctuations from a maximum until the rotor rotational frequency (Nr) matches the engine rotational frequency (Ne) are smaller than in the comparative examples. Consequently, acceleration of the rotor 25 at points at which the rotor rotational frequency (Nr) matches the engine rotational frequency (Ne) is smaller than in the comparative examples, and mechanical shock at the reengagement between the clutch inner 52 and the clutch outer 53 is reduced, enabling vibration noise to be reduced and also enabling durability of the one-way clutch 50 to be improved.

In addition, because the descending gradient of the rotor rotational frequency (Nr) is gentler, the points at which the rotor rotational frequency (Nr) matches the engine rotational frequency (Ne) are offset toward the peaks of the ripples of the engine rotational frequency (Ne). In other words, regions in which tensile stresses act on the first belt 60 are reduced. As a result, loss due to speed differences between the engine rotational frequency (Ne) and the electric motor-generator pulley rotational frequency (Np) is reduced compared to the comparative examples, enabling improvements in efficiency. The loss in Embodiment 1 is indicated by $S_a$ in FIG. 5A.

Because it is necessary to adjust engine torque in response to acceleration and deceleration by the driver, and vehicle electrical load conditions, etc., to try to improve drivability and stabilize idling, it is desirable to be able to control torque in the engine 1 relative to various vehicle loads. Sudden generating torque required by an automotive alternator to generate power to drive electric fans, or to respond to switching ON of items of electrical equipment by users, etc., is loaded onto the engine. In answer to that, field current to the rotor has conventionally been controlled so as to increase gradually in such a way that sudden generating torque does not arise. However, the extent of control is limited to making the torque required for power generation increase gradually, or stopping power generation to reduce the generating torque required for power generation, etc., and it has been impossible to eliminate inertial torque from the rotor of the automotive alternator itself.

According to Embodiment 1, the load that is imposed on the engine 1 by the electric motor-generator 15 can be reduced by driving the electric motor-generator 15 as an electric motor. In addition, during idling of the engine 1, the engine 1 and the electric motor-generator 15 can be isolated from each other by increasing the rotation assisting torque of the rotor 25 so as to exceed peak engine torque, enabling the load that is imposed on the engine 1 by the electric motor-generator 15 to be eliminated.

The first and second electric motor-generator pulleys 57 and 58 are configured integrally with the clutch outers 53 of the first and second one-way clutches 50 and 51 that are juxtaposed axially on the rotating shaft 28, and the water pump 10 is coupled by means of the second electric motor-generator pulley 58 and the second belt 61. Thus, the transmission of torque to the water pump 10 can be performed not only from the engine 1, but also from the electric motor-generator 15. This effectively means that it becomes possible for the electric motor-generator 15 to control the interrelationship of torque between the water pump 10 and the engine 1, and interrelationships between the water pump 10 and other auxiliary machines that are coupled to the engine 1 such as the oil pump 4, and the air conditioner 7, etc. Consequently, the degree of freedom in controlling engine torque can be increased in response to vehicle and vehicle electrical load conditions.

Because the second electric motor-generator pulley 58 is mounted to the rotating shaft 28 with the second one-way clutch 51 interposed in such a way that reaction forces that lead to loss such as rotational ripples from the water pump 10, etc., are not transmitted to the rotating shaft 28, loss of belt rotation at the second electric motor-generator pulley 58 is reduced.

Because the first and second electric motor-generator pulleys 57 and 58 are juxtaposed axially on the rotating shaft 28, it is not necessary to dispose the first and second electric motor-generator pulleys 57 and 58 horizontally, improving belt layout characteristics, and enabling the degree of freedom in the layout of the auxiliary machines that are coupled to the engine 1 to be increased.

Now, the field winding 27 of the rotor 25 is wound with 400 turns of copper wire that has a wire diameter of 1 mm, and has a resistance of 0.219 Ω and an inductance of 50 mH. The armature winding 32 of the stator 30 is configured by delta-connecting windings in which copper wire that has a wire diameter of 1.6 mm has been wound for three turns that have been connected in parallel. It has a resistance of 9 mΩ and an inductance of 0.034 mH. Because of this, the rotor 25 has a time constant of 100 msec and the stator 30 has a time constant of 6.8 msec, and it can be seen that the responsiveness of the stator 30 is much better than that of the rotor 25. Consequently, for the electric motor function and the generating function of the electric motor-generator 15, it is preferable to fix the electric current of the rotor 25 and control the value and phase of the electric current that is passed to the armature winding 32 of the stator 30. Fine torque control in response to engine ripples is thereby made possible, enabling full and efficient use of driving force and electric power.

Effects such as the following can additionally be achieved by actively using the electric motor function of the electric motor-generator 15.

First, during engine acceleration, if the electric motor-generator pulley rotational frequency (Np) is lower than the engine rotational frequency (Ne) and the electric motor-generator 15 is being driven by the engine 1 so as to generate power, the rollers 55 are in an interlocked state in the wedge-shaped spaces 54, and large stresses are acting on the clutch inner 52 and the clutch outer 53. By driving the electric motor-generator 15 as an electric motor in this state, the stresses that act on the clutch inner 52 and the clutch outer 53 can be reduced, enabling durability of the one-way clutch 50 to be improved and also enabling the generation of noise to be suppressed. Moreover, because this region is a region in which the electric motor-generator 15 works effectively as a generator, it is not desirable to drive the electric motor-generator 15 as an electric motor throughout the entire region, but rather it is desirable to limit this to an initial period during engine acceleration. By driving the electric motor-generator 15 as an electric motor, loads that act on the engine 1 are also reduced, improving acceleration performance of the engine 1.

Because the electric motor-generator 15 is equipped with the first one-way clutch 50, the rotor 15 does not decelerate immediately due to inertia during deceleration of the engine 1, and the first one-way clutch 50 slips. Then, when the rotational frequency of the rotor 15 becomes equal to the rotational frequency of the engine 1, the first one-way clutch 50 reengages. Here, the time until the first one-way clutch 50 reengages can be delayed by driving the electric motor-generator 15 as an electric motor, enabling rotational ripples to be reduced. The load that acts on the first one-way clutch 50 when the first one-way clutch 50 reengages is also reduced, enabling durability of the one-way clutch 50 to be improved and also enabling the generation of noise to be suppressed. In addition, deceleration time can be made gentler on the engine 1.

During rapid deceleration of the engine 1, generation of noise and heat from the electric motor-generator 15 and the first one-way clutch 50 become problems because the first one-way clutch 50 slips and the rotor 25 does not decelerate due to inertia. By rapidly braking the electric motor-generator 15 so as to synchronize the rotational frequency of the rotor 25 with the rotational frequency of the engine 1 at this time, the rotor 25 is synchronized with the rotational frequency of the engine 1 and rapidly decelerated, suppressing the generation of noise and heat and also improving durability of the first one-way clutch 50.

Because the rotor 25 stops later than the engine 1 due to inertia when the engine 1 comes to a halt from a slow speed, noise is generated by the fans 29 as a result of rotation of the rotor 25. By braking the electric motor-generator 15 at this time so as to make the rotational frequency gradient of the two equal as they stop, the generation of noise by the fans 29 can be prevented.

In Embodiment 1 above, rotational torque from the electric motor-generator 15 is transmitted to the water pump 10 by means of the second one-way clutch 51 and the second belt 61, but an auxiliary machine that requires a temporary driving force, such as a variable valve timing mechanism, for example, may also be used instead of the water pump 10. A variable valve timing mechanism is adopted in order to achieve fuel economy and high output, or to achieve fuel economy and low emissions, timed driving of a camshaft being performed by a hydraulic solenoid. Thus, because hydraulic pressure is employed as a working medium, the increase in hydraulic pressure cannot keep up with the rapid acceleration of the engine during rapid acceleration of an engine, for example, preventing the variable valve timing mechanism from operating in response to the rapid acceleration of the engine. IN that case, the variable valve timing mechanism can be operated in response to the rapid acceleration of the engine by driving the electric motor-generator 15 as an electric motor so as to assist the increase in hydraulic pressure with rotational torque from the electric motor-generator 15 during the rapid acceleration of the engine. Thus, if a temporary driving force is needed, the required driving force can be provided by driving the electric motor-generator 15 as an electric motor.

Embodiment 2

Figure 6:
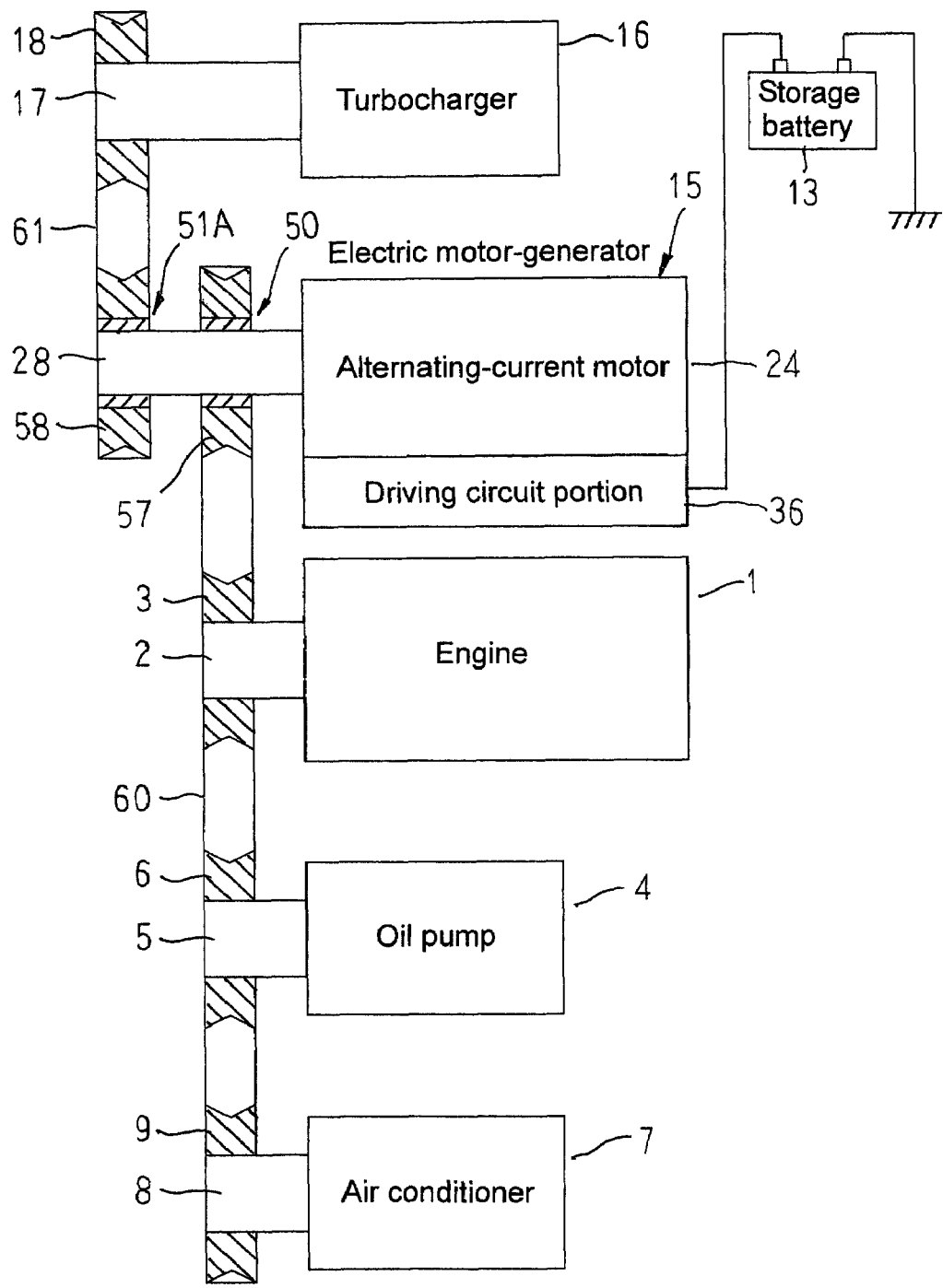
FIG. 6 is a diagram that schematically shows a power transmission pathway in an automotive drive apparatus according to Embodiment 2 of the present invention.

FIG. 6 is a diagram that schematically shows a power transmission pathway in an automotive drive apparatus according to Embodiment 2 of the present invention.

In FIG. 6, a second one-way clutch 51A is fixed to a rotating shaft so as to be axially adjacent to a first one-way clutch 50. A second electric motor-generator pulley 58 is configured integrally on a clutch outer 53 of the second one-way clutch 51A. A turbocharger pulley 18 is fixed to a rotating shaft 17 of a turbocharger 16 that functions as a second auxiliary machine. A second belt 61 is wound around the turbocharger pulley 18 and the second electric motor-generator pulley 58. Here, the second one-way clutch 51A, the second electric motor-generator pulley 58, and the turbocharger pulley 18 constitute a second power transmitting means.

Moreover, the rest of this embodiment is configured in a similar manner to Embodiment 1 above.

Here, the second one-way clutch 51A is configured in a similar manner to the second one-way clutch 51 in Embodiment 1 above except for the fact that a direction of torque transmission is different. Specifically, the wedge-shaped spaces 54 of the second one-way clutch 51A are configured so as to become gradually narrower in a reverse direction to the wedge-shaped spaces 54 of the second one-way clutch 51. Moreover, the direction of torque transmission of the second one-way clutch 51A is the same as that of the first one-way clutch 50.

In an automotive drive apparatus that is configured in this manner, rotational torque from the engine 1 is transmitted from the crank shaft 2 to the oil pump pulley 6, the air conditioner pulley 9, and the first electric motor-generator pulley 57 by means of the crank pulley 3 and the first belt 60. The rotational torque that is transmitted to the first electric motor-generator pulley 57 is transmitted to the rotating shaft 28 of the electric motor-generator 15 by means of the first one-way clutch 50 so as to drive the oil pump 4, the air conditioner 7, and the electric motor-generator 15. The second one-way clutch 51A slips such that rotational torque from the rotating shaft 28 of the electric motor-generator 15 is not transmitted to the rotating shaft 17 of the turbocharger 16 by means of the second electric motor-generator pulley 58 and the second belt 61.

The turbocharger 16 is driven by an external driving force that is different than the driving force from the engine 1. Thus, when the turbocharger 16 is driven, the rotational torque therefrom is transmitted to the second electric motor-generator pulley 58 by means of the turbocharger pulley 18 that is fixed to the rotating shaft 17 and the second belt 61. Then, when the rotational frequency of the second electric motor-generator pulley 58 becomes greater than the rotational frequency of the rotating shaft 28, the rollers 55 interlock with the wedge-shaped spaces 54, and the rotational torque from the turbocharger 16 is transmitted to the rotating shaft 28. The rotor 25 is thereby driven to rotate. Here, the driving force from the turbocharger 16 can be recovered to the storage battery 13 by operating the electric motor-generator 15 as a generator.

Now, if the rotational frequency of the rotating shaft 28 becomes greater than the rotational frequency of the first electric motor-generator pulley 57 when the rotational torque from the turbocharger 16 is being transmitted to the rotating shaft 28, the first one-way clutch 50 slips, and the rotational torque from the turbocharger 16 is not transmitted to the crank shaft 2 of the engine 1 by means of the first electric motor-generator pulley 57 and the first belt 60.

Thus, in Embodiment 2, electric power can be recovered by means of the electric motor-generator 15 in response to the operating conditions of the storage battery 13 and the turbocharger 16 without affecting other systems. In particular, "regeneration", in which kinetic energy that would otherwise be wasted such as inertial forces in exhaust gas, etc., is recovered and used to generate power, can be used effectively, achieving large fuel consumption improvements.

Because reaction forces that lead to loss such as rotational ripples from the engine 1, and the rotor 25, etc., are not transmitted to the second electric motor-generator pulley 58, loss of belt rotation at the second electric motor-generator pulley 58 is reduced.

During normal driving of the engine 1, the second one-way clutch 51A slips, and the load on the engine 1 is not increased. Because the second one-way clutch 51A normally slips, it is not necessary to increase durability of the second one-way clutch 51A excessively, enabling reductions in size.

Moreover, in Embodiment 2, it goes without saying that similar effects to those in Embodiment 1 above can also be achieved by driving the electric motor-generator 15 as an electric motor in a similar manner to Embodiment 1 above.

Embodiment 3

Figure 7:
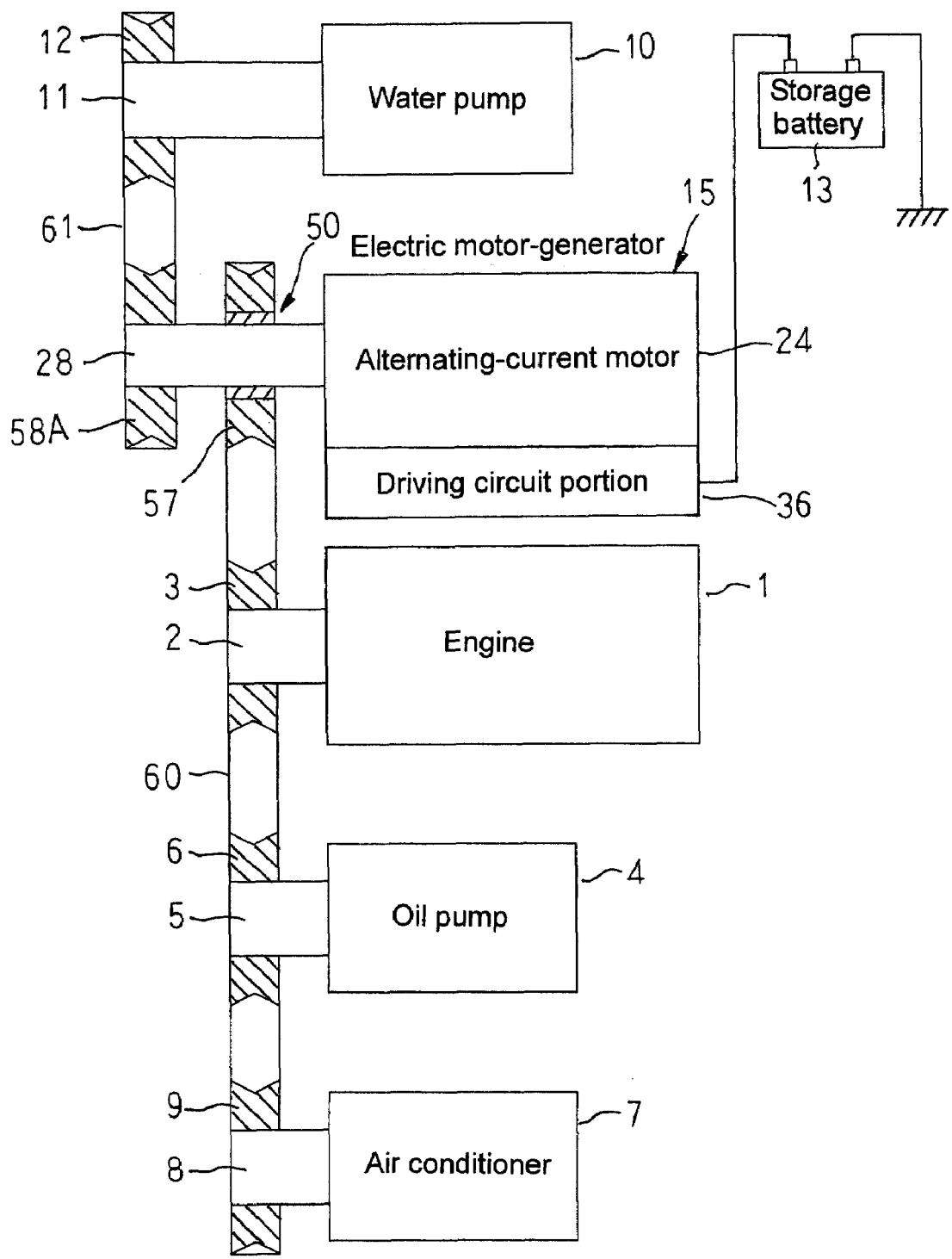
FIG. 7 is a diagram that schematically shows a power transmission pathway in an automotive drive apparatus according to Embodiment 3 of the present invention.

FIG. 7 is a diagram that schematically shows a power transmission pathway in an automotive drive apparatus according to Embodiment 3 of the present invention.

In FIG. 7, a second electric motor-generator pulley 58A is fixed directly to a rotating shaft so as to be adjacent to a first one-way clutch 50. Here, the second electric motor-generator pulley 58A and a water pump pulley 12 constitute a second power transmitting means.

Moreover, the rest of this embodiment is configured in a similar manner to Embodiment 1 above.

In an automotive drive apparatus that is configured in this manner, rotational torque from the engine 1 is transmitted from the crank shaft 2 to the oil pump pulley 6, the air conditioner pulley 9, and the first electric motor-generator pulley 57 by means of the crank pulley 3 and the first belt 60. The rotational torque that is transmitted to the first electric motor-generator pulley 57 is transmitted to the rotating shaft 28 of the electric motor-generator 15 by means of the first one-way clutch 50 so as to drive the oil pump 4, the air conditioner 7, and the electric motor-generator 15. Rotational torque from the rotating shaft 28 of the electric motor-generator 15 is transmitted to the water pump pulley 12 by means of the second electric motor-generator pulley 58A and the second belt 61, driving the water pump 10.

Now, if the rotational frequency of the rotating shaft 28 becomes greater than the rotational frequency of the first electric motor-generator pulley 57 when inertial force from the water pump 10 is being transmitted to the rotating shaft 28 by means of the water pump pulley 12, the second belt 61, and the second electric motor-generator pulley 58A, the first one-way clutch 50 slips. Thus, the rotor 25 is driven to rotate by the inertial force from the water pump 10. Here, the inertial force from the water pump 10 can be recovered to the storage battery 13 by operating the electric motor-generator 15 as a generator.

Thus, in Embodiment 3, "regeneration", in which the inertial force from the water pump 10 is recovered and used to generate power, can be used effectively, achieving large fuel consumption improvements.

Because the second electric motor-generator pulley 58A is fixed to the rotating shaft 28 directly, transmission of torque between the water pump 10 and the electric motor-generator 15 becomes possible. Thus, it effectively becomes possible for the electric motor-generator 15 to control the mutual influence of torque between the water pump 10 and the engine 1, and mutual influences between the water pump 10 and other auxiliary machines such as the oil pump 4, the air conditioner 7, etc.

Moreover, in Embodiment 3, it goes without saying that similar effects to those in Embodiment 1 above can also be achieved by driving the electric motor-generator 15 as an electric motor in a similar manner to Embodiment 1 above.

Embodiment 4

Figure 8:
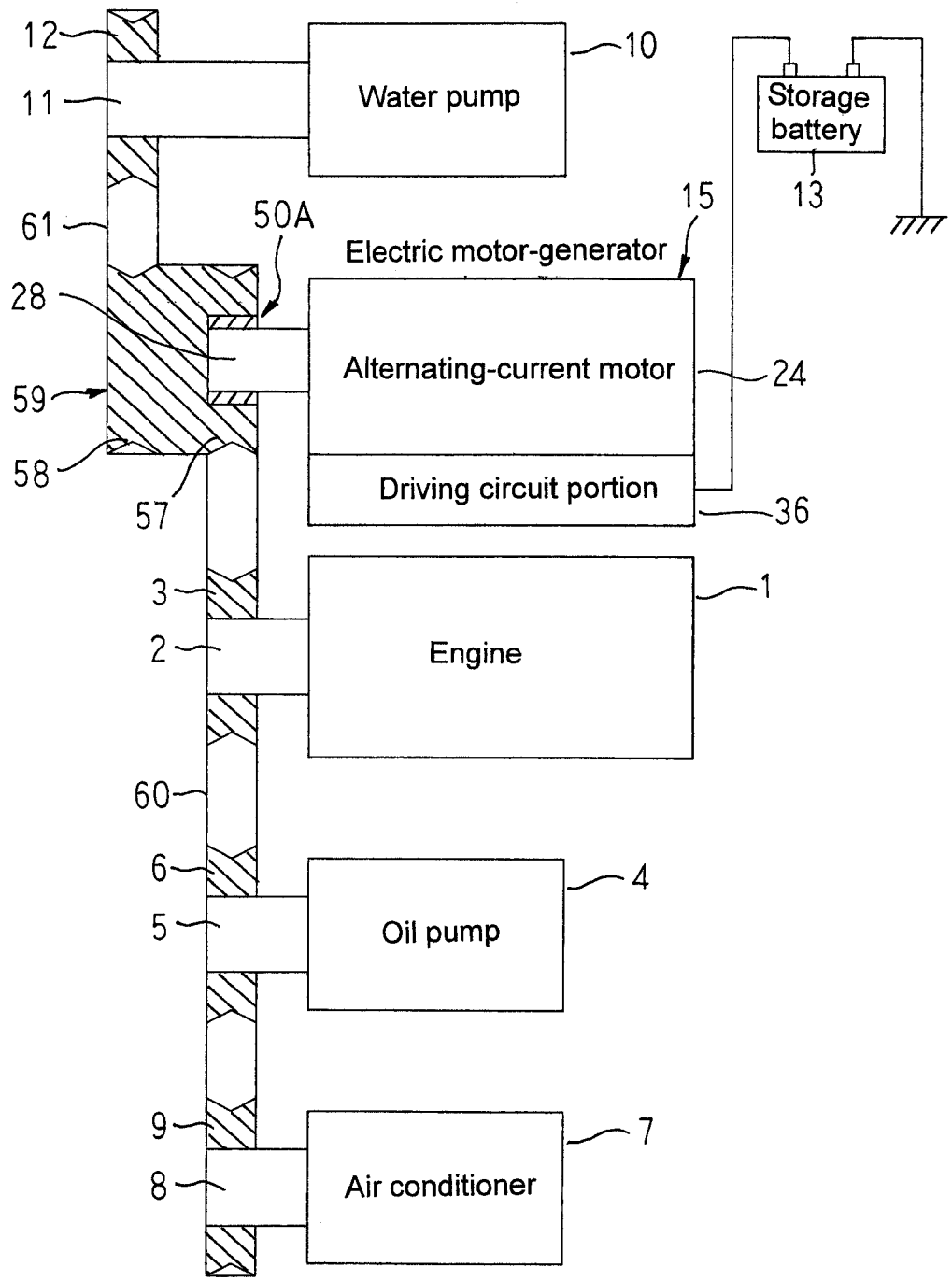
FIG. 8 is a diagram that schematically shows a power transmission pathway in an automotive drive apparatus according to Embodiment 4 of the present invention.

FIG. 8 is a diagram that schematically shows a power transmission pathway in an automotive drive apparatus according to Embodiment 4 of the present invention.

In FIG. 8, a first one-way clutch 50A is fixed to a rotating shaft 28 such that a direction of torque transmission is the same as that of the first one-way clutch 50A. A pulley body 59 is configured integrally on a clutch outer 53 of the first one-way clutch 50A. First and second electric motor-generator pulleys 57 and 58 are formed integrally on the pulley body 59 so as to be axially adjacent. Here, a crank pulley 3, an oil pump pulley 6, an air conditioner pulley 9, the first one-way clutch 50A, the first electric motor-generator pulley 57 (pulley body 59), and a first belt 60 constitute a first power transmitting means, and the second electric motor-generator pulley 58 (pulley body 59), a water pump pulley 12, and a second belt 61 constitute a second power transmitting means.

Moreover, the rest of this embodiment is configured in a similar manner to Embodiment 1 above.

In an automotive drive apparatus that is configured in this manner, rotational torque from the engine 1 is transmitted from the crank shaft 2 to the oil pump pulley 6, the air conditioner pulley 9, and the pulley body 59 by means of the crank pulley 3 and the first belt 60. The rotational torque that is transmitted to the pulley body 59 is transmitted to the rotating shaft 28 of the electric motor-generator 15 by means of the first one-way clutch 50A so as to drive the oil pump 4, the air conditioner 7, and the electric motor-generator 15. The rotational torque that is transmitted to the pulley body 59 is transmitted to the water pump pulley 12 by means of the second belt 61, driving the water pump 10.

Here, the first one-way clutch 50A slips when the electric motor-generator 15 is driven as an electric motor, interrupting torque transmission between the engine 1 and the electric motor-generator 15. Thus, torque transmission from the engine 1 to the electric motor-generator 15 is eliminated, enabling torque transmission to the water pump 10 to be increased proportionately. It thereby effectively becomes possible for the electric motor-generator 15 to control the mutual influence of torque between the water pump 10 and the engine 1, and mutual influences between the water pump 10 and other auxiliary machines such as the oil pump 4, the air conditioner 7, etc.

Moreover, in Embodiment 4, it goes without saying that similar effects to those in Embodiment 1 above can also be achieved by driving the electric motor-generator 15 as an electric motor in a similar manner to Embodiment 1 above.

Embodiment 5

Figure 9:
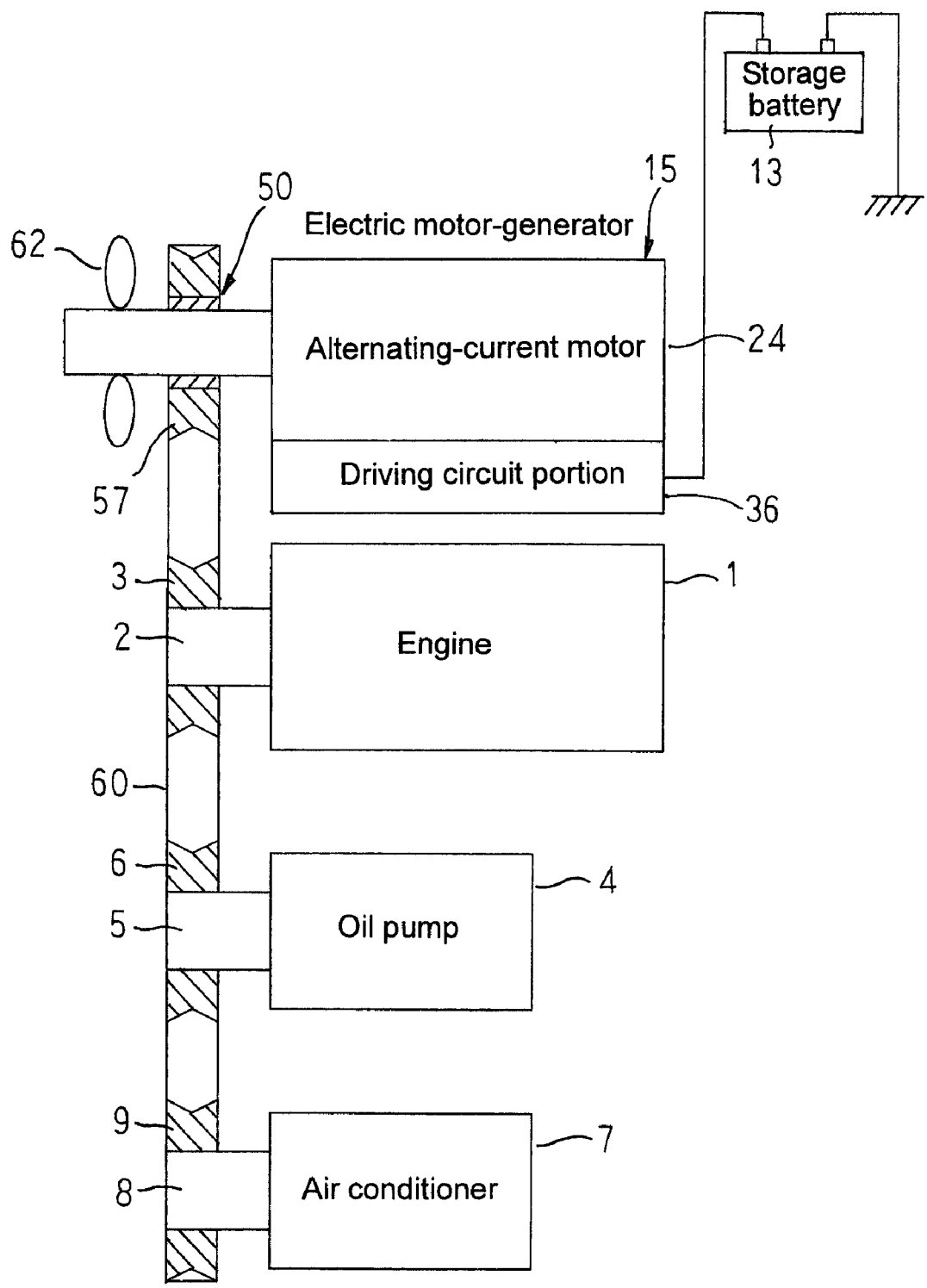
FIG. 9 is a diagram that schematically shows a power transmission pathway in an automotive drive apparatus according to Embodiment 5 of the present invention.

FIG. 9 is a diagram that schematically shows a power transmission pathway in an automotive drive apparatus according to Embodiment 5 of the present invention.

In FIG. 9, a fan 62 is fixed directly to a rotating shaft 28.

Moreover, the rest of this embodiment is configured in a similar manner to Embodiment 1 above.

According to Embodiment 5, because the fan 62 can be driven directly by the driving force from the engine 1 or the driving force from the electric motor-generator 15, it becomes possible for the electric motor-generator 15 to control the mutual influence of driving of the fan 62 and torque from the engine 1, and mutual influences between the driving of the fan 62 and other auxiliary machines that are coupled to the engine 1 such as the oil pump 4, the air conditioner 7, etc.

Moreover, in Embodiment 5, it goes without saying that similar effects to those in Embodiment 1 above can also be achieved by driving the electric motor-generator 15 as an electric motor in a similar manner to Embodiment 1 above.

What is claimed is:

1. An automotive drive apparatus comprising:
   an engine;
   an electric motor-generator that has a generating function and an electric motor function;
   a first auxiliary machine; and
   a first power transmitting means that performs power transmission among a crank shaft of said engine, a rotating shaft of said electric motor-generator, and a rotating shaft of said first auxiliary machine,
   wherein:
   said first power transmitting means has:
      a crank pulley that is mounted to said crank shaft of said engine;
      a first electric motor-generator pulley that is mounted to said rotating shaft of said electric motor-generator;
      a first auxiliary machine pulley that is mounted to said rotating shaft of said first auxiliary machine;
      a first belt that is wound around said crank pulley, said first electric motor-generator pulley, and said first auxiliary machine pulley; and
      a first one-way clutch that is interposed between said rotating shaft of said electric motor-generator and said first electric motor-generator pulley so as to transmit a rotational driving force from said crank shaft of said engine to said rotating shaft of said electric motor-generator without transmitting a rotational driving force from said rotating shaft of said electric motor-generator to said crank shaft of said engine; and
   said electric motor-generator comprises a driving portion for generator operation and a control portion for selectively implementing motor operation whereby the electric motor generator is selectively motor driven and is selectively used as a brake while said engine is being driven, said selective use resulting in reduced differences between rotational frequencies of the engine and other components.

2. An automotive drive apparatus according to claim 1, further comprising:
a second auxiliary machine; and
a second power transmitting means that performs power transmission between said rotating shaft of said electric motor-generator and a rotating shaft of said second auxiliary machine.

3. An automotive drive apparatus according to claim 1, wherein said electric motor-generator is motor driven during acceleration of said engine.

4. An automotive drive apparatus according to claim 1, wherein said electric motor-generator is motor driven during deceleration of said engine.

5. An automotive drive apparatus according to claim 1, wherein said electric motor-generator is motor driven during idling of said engine in a region in which rotational frequency of said rotating shaft of said electric motor-generator is greater than rotational frequency of said engine due to inertia of a rotor of said electric motor-generator.

6. An automotive drive apparatus according to claim 1, further comprising a storage battery, said electric motor-generator being motor driven in response to a capacity state of said storage battery.

7. An automotive drive apparatus according to claim 1, wherein said electric motor-generator is motor driven during rapid deceleration of said engine so as to synchronize a rotational frequency of said rotating shaft of said electric motor-generator to a rotational frequency of said engine.

8. An automotive drive apparatus according to claim 1, wherein said electric motor-generator is an alternating-current electric motor-generator and is motor controlled by an armature current that is passed to an armature winding of a stator.

9. An automotive drive apparatus comprising:
an engine;
an electric motor-generator that has a generating function and an electric motor function;
a first auxiliary machine; and
a first power transmitting means that performs power transmission among a crank shaft of said engine, a rotating shaft of said electric motor-generator, and a rotating shaft of said first auxiliary machine,
wherein:
said first power transmitting means has:
a crank pulley that is mounted to said crank shaft of said engine;
a first electric motor-generator pulley that is mounted to said rotating shaft of said electric motor-generator;
a first auxiliary machine pulley that is mounted to said rotating shaft of said first auxiliary machine;
a first belt that is wound around said crank pulley, said first electric motor-generator pulley, and said first auxiliary machine pulley; and
a first one-way clutch that is interposed between said rotating shaft of said electric motor-generator and said first electric motor-generator pulley so as to transmit a rotational driving force from said crank shaft of said engine to said rotating shaft of said electric motor-generator without transmitting a rotational driving force from said rotating shaft of said electric motor-generator to said crank shaft of said engine; and
said electric motor-generator is motor driven while said engine is being driven;
wherein said automotive drive apparatus further comprises:
a second auxiliary machine; and
a second power transmitting means that performs power transmission between said rotating shaft of said electric motor-generator and a rotating shaft of said second auxiliary machine; and
wherein said second power transmitting means comprises:
a second electric motor-generator pulley that is mounted to said rotating shaft of said electric motor-generator so as to be axially adjacent to said first electric motor-generator pulley;
a second auxiliary machine pulley that is mounted to said rotating shaft of said second auxiliary machine; and
a second belt that is wound around said second electric motor-generator pulley and said second auxiliary machine pulley.

10. An automotive drive apparatus according to claim 9, wherein a second one-way clutch that transmits a rotational driving force from said rotating shaft of said electric motor-generator to said rotating shaft of said second auxiliary machine without transmitting a rotational driving force from said rotating shaft of said second auxiliary machine to said rotating shaft of said electric motor-generator is interposed between said second electric motor-generator pulley and said rotating shaft of said electric motor-generator.

11. An automotive drive apparatus according to claim 9, wherein a second one-way clutch that transmits a rotational driving force from said rotating shaft of said second auxiliary machine to said rotating shaft of said electric motor-generator without transmitting a rotational driving force from said rotating shaft of said electric motor-generator to said rotating shaft of said second auxiliary machine is interposed between said second electric motor-generator pulley and said rotating shaft of said electric motor-generator.

12. An automotive drive apparatus according to claim 9, wherein said second electric motor-generator pulley is fixed directly to said rotating shaft of said electric motor-generator.

13. An automotive drive apparatus according to claim 9, wherein said second electric motor-generator pulley is formed integrally with said first electric motor-generator pulley.

* * * * *